No. 731,939. PATENTED JUNE 23, 1903.
J. D. McKENZIE.
COMBINED PLANTER, COTTON CHOPPER, AND CULTIVATOR.
APPLICATION FILED NOV. 29, 1902.
NO MODEL. 3 SHEETS—SHEET 1.
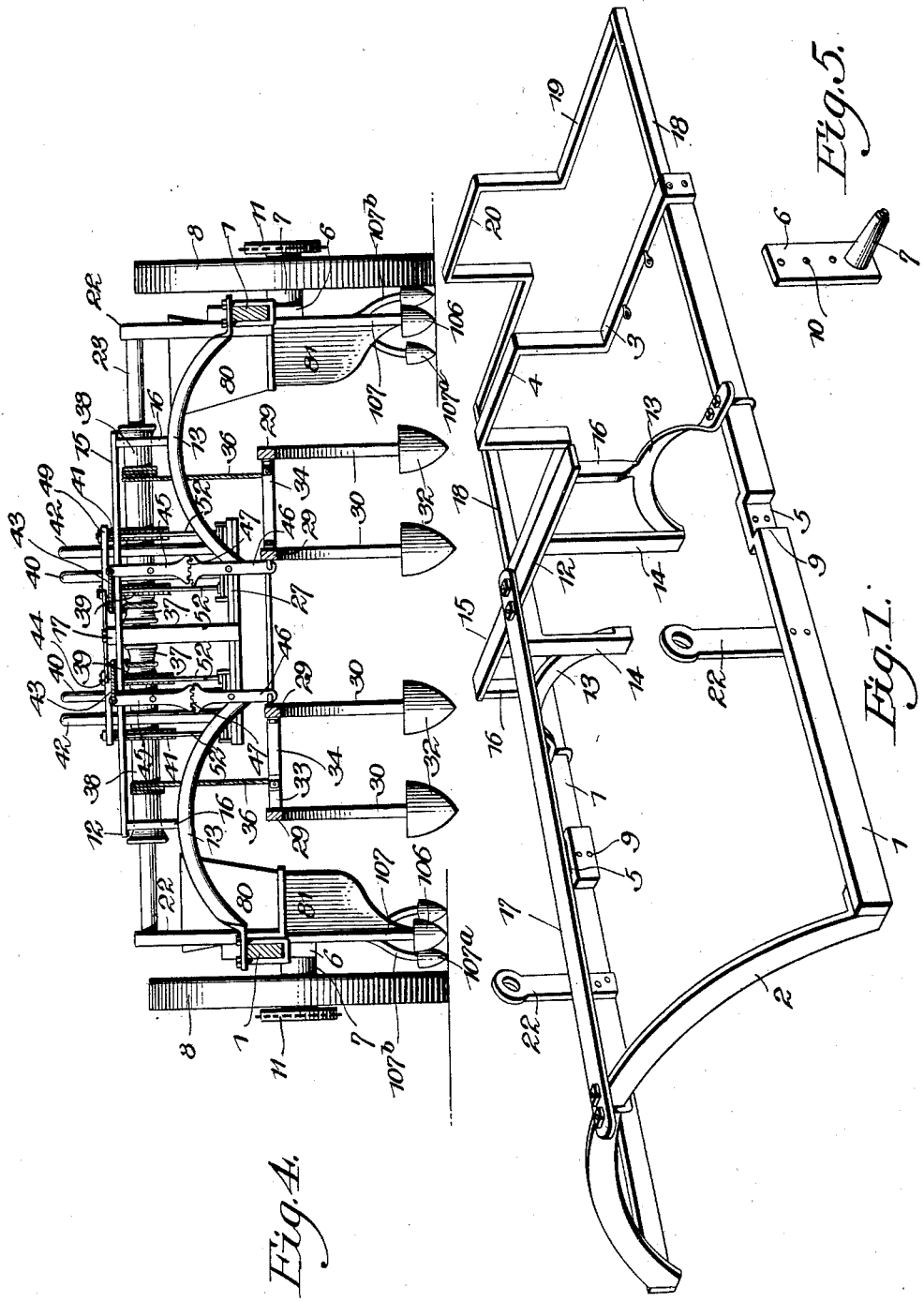

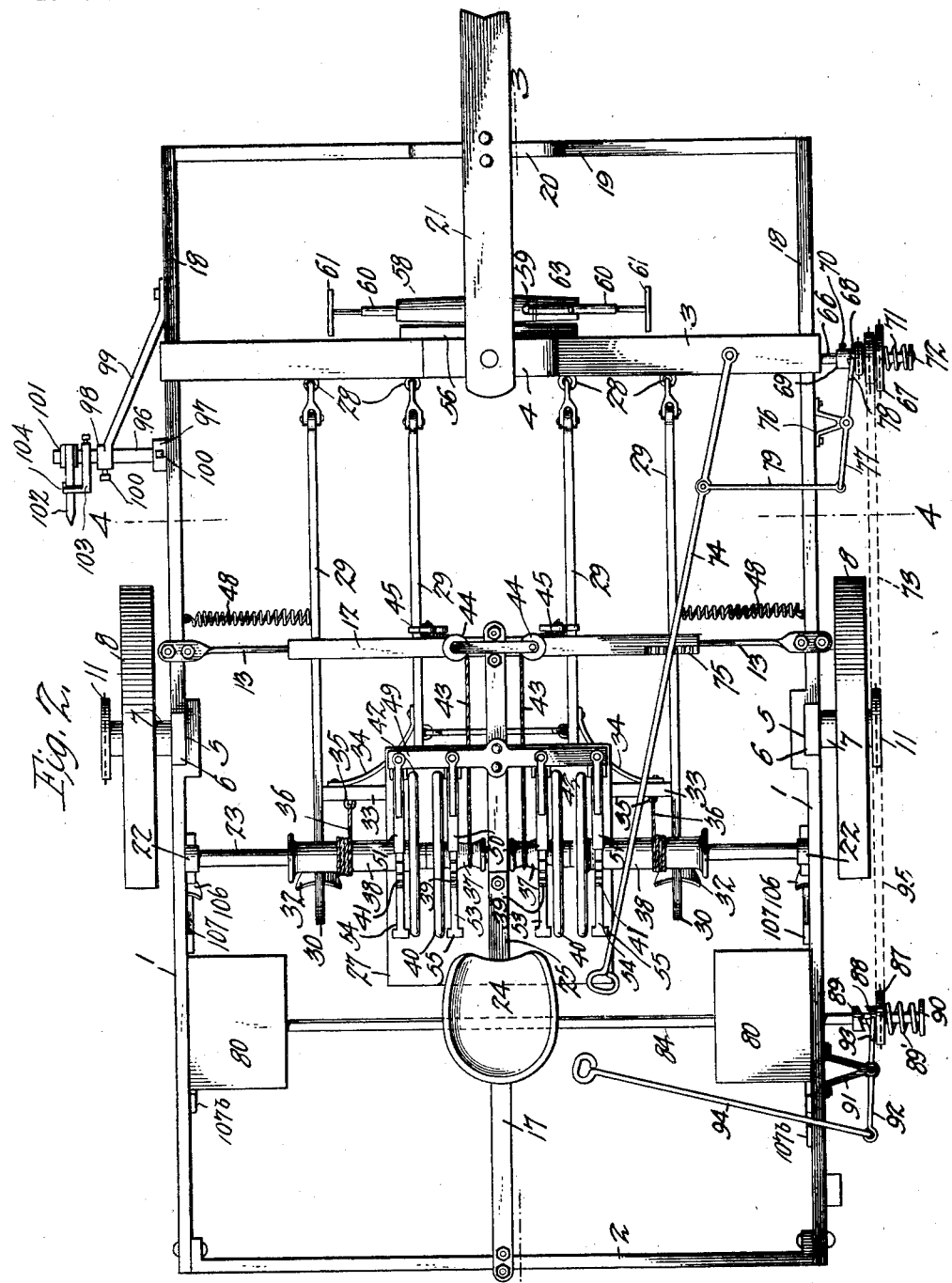

No. 731,939. PATENTED JUNE 23, 1903.
J. D. McKENZIE.
COMBINED PLANTER, COTTON CHOPPER, AND CULTIVATOR.
APPLICATION FILED NOV. 29, 1902.
NO MODEL. 3 SHEETS—SHEET 3.
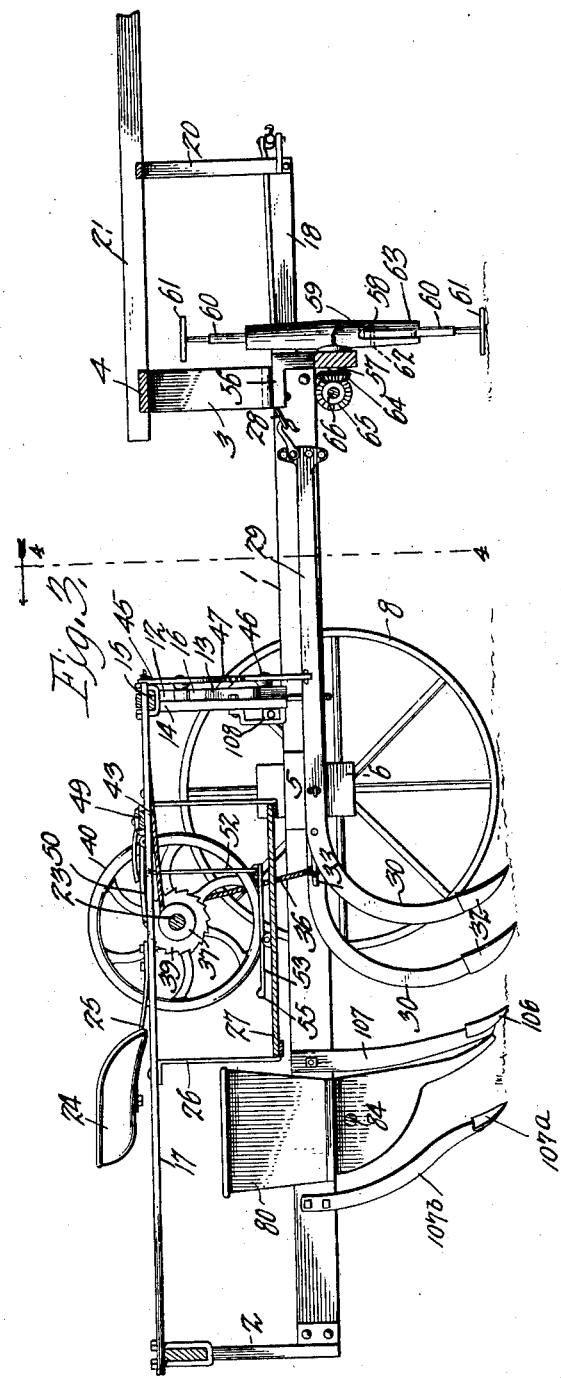
Witnesses
J. D. McKenzie, Inventor
by C. A. Snow & Co
Attorneys No. 731,939.	Patented June 23, 1903.

UNITED STATES PATENT OFFICE.

JOHN D. McKENZIE, OF FORT WORTH, TEXAS.

COMBINED PLANTER, COTTON-CHOPPER, AND CULTIVATOR.

SPECIFICATION forming part of Letters Patent No. 731,939, dated June 23, 1903.

Application filed November 29, 1902. Serial No. 133,274. (No model.)

*To all whom it may concern:*

Be it known that I, JOHN D. MCKENZIE, a citizen of the United States, residing at Fort Worth, in the county of Tarrant and State of Texas, have invented a new and useful Combined Planter, Cotton-Chopper, Cultivator, &c., of which the following is a specification.

This invention relates to an improved agricultural implement in which shall be comprised a seed-planter, plow, cultivator, cotton-chopper, and various other agricultural implements, which may be used separately or combined, according to their nature and to the purposes for which they are employed.

My invention may be described as consisting, essentially, in an improved frame structure adapted to support a variety of implements, some of which may be said to be permanent fixtures of the frame, while others are used interchangeably, provision being made for properly mounting them in the said frame, so as to cause them to operate or be operated in the desired manner.

Specifically, my invention consists in the improved construction, arrangement, and combination of parts, which will be hereinafter fully described, and particularly pointed out in the claims.

In the accompanying drawings, Figure 1 is a perspective view showing the frame structure which constitutes the base of my invention. Fig. 2 is a plan view showing the device equipped with seedboxes, with cultivators, and with a cotton-chopper. Fig. 3 is a longitudinal sectional view of the machine on the line 3 3 in Fig. 2. Fig. 4 is a transverse sectional view taken on the line 4 4 in Fig. 3. Fig. 5 is a perspective detail view of one of the spindle-carrying slides.

Corresponding parts in the several views are indicated by similar numerals of reference.

The frame of my improved machine is made of iron, and it may be described as consisting of side rails 1 1, which are set on edge, as will be clearly seen in Fig. 1, so as to be capable of resisting a considerable vertical strain. A curved arched rear bar 2, likewise set on edge, connects the rear ends of the side rails 1 1, and their front ends are connected by a front bar 3, which is placed with its flat side uppermost and which is bent so as to form a centrally-disposed upwardly-extending arch 4, which, however, in the drawings has been illustrated as having angular corners, the exact shape of said arch being unimportant. The frame-bars 1, 1, 2, and 3 are securely and permanently bolted together at the corners, so as to form a frame structure of great strength and rigidity and at the same time sufficiently light to be easily handled.

The side bars 1 1 of the frame are bent intermediate of their ends to form recesses 5 in their outer sides for the accommodation of vertically-adjustable slides 6, carrying spindles 7, upon which the transporting-wheels 8 are journaled. These slides are secured in position adjustably by means of bolts, which are adapted to engage perforations 9 10, formed, respectively, in the side rails and in the slides, the latter being provided with a plurality of such perforations to enable them to be secured at any desired point of adjustment. As will be readily understood, the frame of the machine and the parts supported thereon are thus made capable of being adjusted vertically and supported at any suitable distance above the ground. The transporting-wheels 8 are provided with sprocket-wheels 11, firmly secured to the hubs thereof in order that motion may be transmitted from said sprocket-wheels to the various parts of the machine.

In addition to the rear and front bars 2 3 the frame has an intermediate cross-bar or cross-frame 12, comprising a pair of arches 13, the outer ends of which are supported upon and secured to the side rails of the frame. At the inner ends of the arms 13 are uprights 14, which support a top cross-piece 15, the ends of which are supported by vertical braces rising centrally from the arches 13. A longitudinal bar or frame-beam 17 is supported upon and connects the cross-bar 15 with the rear frame-bar 2. The frame is also provided with forwardly-extending brackets 18 at the sides thereof, said brackets serving to support a cross-piece 19, having a centrally-disposed arch 20, which, in conjunction with the arch 4, serves to support the tongue 21.

The side rails of the frame in rear of the wheels have upwardly-extending brackets 22, one at each side of the frame, said brackets serving to support a transverse shaft 23, which is located in front of the driver's seat 24, which has a spring-support 25 secured upon the longitudinal frame-bar 17. Brackets 26, depending from the latter, serve to support a footboard 27, as will be seen in Fig. 3 of the drawings.

The front frame-bar 3 is provided with rearwardly-extending eyes 28, serving for the attachment of the front ends of plow-beams or cultivator-beams, as clearly shown in Figs. 2 and 3, where said beams are designated 29. The plow-beams are made of iron and are curved downwardly and forwardly at their rear ends to form standards 30, to which plows either for turning or for bedding land or cultivator-blades, as 32, may be interchangeably secured. It will of course be understood that I do not limit myself with regard to the kind or type of plows, shovels, or cultivator-blades that may be used. Any well-known kind or pattern of such blades may be used within the scope of my invention. It will also be understood that with regard to the relative length or disposition of the plow-beams I do not in any degree limit myself. This will be governed entirely by the purpose for which the machine is to be employed at the time, whether for breaking or bedding land, for cultivating corn, for cultivating cotton, either simultaneously with or independently of the use of the cotton-chopping device, to be hereinafter described, or for other purposes. It will also be understood that plow or cultivator beams of different constructions may be used in connection with my invention without departing from the spirit or scope thereof, the structure of these, as well as other interchangeable parts of the device, being such as will best lend itself to the purposes of my invention. As illustrated in the drawings, the cultivator-beams are connected on either side of the longitudinal center of the machine in gangs of two, each pair of beams being connected by a cross-bar 33, forming a transverse brace, and by a yoke 34, having a loop 35 for the attachment of a hoisting element, here shown as consisting of a rope 36.

The transverse shaft 23 of the machine is provided with two sets of winding-drums 37 and 38, one pair of each, which are mounted revolubly upon the said shaft. The inner or centrally-disposed drums 37 are provided with ratchet-wheels 39 and hand-wheels 40 at their outer ends. The inner ends of the outer winding-drums are likewise provided with ratchet-wheels 41 and hand-wheels 42, the hand-wheels 40 and 42 being thus disposed so as to be conveniently accessible to the driver, whose seat 24, as already described, is located in rear of the transverse shaft 23. The ropes 36, forming the hoisting elements for the plows or cultivators, are attached to and wound upon the outer drums 38. Ropes 43, attached to and wound upon the drums 37, are guided over pulleys 44, journaled upon the upper side of the top bar 15 of the transversely-disposed frame 12. Pivotally mounted upon the front side of the uprights 14 of said frame are pairs of segment-levers 45 46, the meeting ends of which are provided with toothed segments 47, meshing together, so that a rocking motion may be transmitted from the upper levers 45 to the lower levers 46. The upper ends of the upper levers 45 are suitably connected with the rope 43 and the lower ends of the lower levers 46 are connected with the inner plow or cultivator beams at or near the inner ends of the transverse braces 33. Between the outer sides of the outer plow or cultivator beams 29, at the inner sides of the side rails of the frame, are interposed coiled springs 48, which are suitably connected with the said beams and side rails, so that the tendency of said springs shall be to force the gangs of plows or cultivators in an outward direction toward the side rails of the frame of the machine.

A cross-bar 49, which may be mounted upon the longitudinal frame-bar 17, supports two pairs of spring-actuated pawls 50 and 51, which engage, respectively, the ratchet-wheels 39 and 41, so as to restrain the drums connected with said ratchet-wheels from turning reversely upon the shaft 23. In order to release said spring-actuated pawls from active engagement with their respective ratchets, I have here shown each of said pawls connected by a rod 52 with a foot-lever 53, mounted upon the footboard 27, the foot-levers controlling the inner drums 37 being designated 53 and those controlling the outer drums 38 being designated 54. These foot-levers are provided at their inner ends with stirrups or treadles 55, by means of which they may be conveniently actuated by the driver. I would here have it understood that I do not propose to confine myself to the precise construction and arrangement of the spring-actuated pawls and the operating means for the same which has been herein shown and described. I reserve to myself the right of constructing and arranging these parts and adapting them to be operated in any convenient and well-known manner within the scope of my invention. The operation of this part of my invention will be readily understood. In order to raise the plows or cultivators from the ground, the operator by means of the hand-wheels 42 imparts a rotary motion to the drums 38, winding thereon the ropes 36, and thus lifting or elevating the plows or cultivators, as the case may be. By releasing the spring-actuated pawls 51 by means of the levers or treadles 54 the ropes 36 will become unwound from their respective drums and the plows or cultivators will be lowered to engage the soil. Similarly, in order to effect the lateral adjustment of the plows or cultivators it is only necessary for the driver to operate the hand-wheels 40, so as to wind the ropes 43 upon the drums 37. The upper and lower ends of the connected toothed segment-levers will thus be forced in an inward direction, consequently forcing the plows or cultivators in an inward direction against the tension of the springs 48 or, in other words, bringing them closer to the longitudinal center of the machine. By releasing the spring-actuated ratchets from the ratchet-wheels 39 the ropes 43 will become unwound from the drums 37 under the tension of the springs 48, which force the gangs of plows or cultivators in an outward direction, as will be readily understood.

A cross-bar 56, (best seen in Fig. 3,) secured to the front frame-bar 3 and spanning the arch 4, supports a boxing or bearing for the shaft 57, carrying at its front end a cotton-chopper, which, as is obvious, may cooperate with the plows or cultivators and which consists of a head 58, provided at its ends with suitable sockets 59, in which shanks 60, carrying hoes or blades 61 at their outer ends, are secured by means of bolts 62 and break-pins 63, so that in the event of obstructions being encountered the chopping means shall receive no injury. At its rear end the shaft 57 carries a bevel-gear 64, meshing with a pinion 65 upon the inner end of a shaft 66, journaled transversely in the frame of the machine and projecting at one side of the latter. Upon its outer end the shaft 66 carries a sprocket-cone 67, which is mounted slidably thereon and which is formed at its inner end with a clutch member 68, adapted to engage a clutch-collar 69, which is secured upon the shaft 66 by the set-screw 70 or other suitable means. A spring 71, coiled upon the outer end of the shaft 66 and bearing at its outer end against a washer-plate 72 upon said shaft, has a bearing at its inner end against the sprocket-cone 67, which is thereby forced in the direction of the clutch-collar 69 to engage the latter. When the cotton-chopper is in use, motion is transmitted thereto by means of a chain 73, connecting the sprocket-wheel 11 of the adjacent transporting-wheel 8 with one of the elements of the cone-sprocket, the speed at which the cotton-chopper is operated being regulated by the adjustment of the chain 73 upon a larger or smaller element of the cone-sprocket, which may be readily done by adding links to or removing them from the chain either to lengthen or shorten the latter. It is obvious that when the cotton-chopper is not in use the chain may be entirely removed.

To enable the cotton-chopping device to be thrown into and out of gear, I use a hand-lever 74, adapted to engage a rack 75 and connected by a rod 79 with a lever 77, one end of which is forked to engage the hub of the cone-sprocket 67, which may thus be thrown outward against the tension of a spring 71 to disengage it from the clutch member 69. The frame carries a seedbox 80, having seed-tubes 81, containing seed-dropping mechanism of any suitable construction, said seed-dropping mechanism being actuated by a shaft 84, extending transversely across the frame and having bearings in the said tubes. The shaft 84 has a sprocket-wheel 87 slidable thereon and having a clutch member 88, adapted to engage a clutch member 89, with which it is held in engagement by a spring 89', interposed between said sprocket-wheel and the washer 90. A lever 92, pivoted to a bracket 91, has a forked end 93 straddling the hub of the sprocket-wheel, and said lever is connected with an operating-rod 94, whereby it may be operated to disengage the sprocket-wheel from the clutch-collar, thereby suspending the operation of the seed-dropping mechanism. A chain 95 (shown in dotted lines in Fig. 2) connects the sprocket-wheel 87 with the sprocket-wheel 11, from which it receives motion. This chain may be detached when the seeding mechanism is not in use. A marking device (shown in Fig. 2) may be used in connection with my invention, said device comprising a shaft 96, having bearings 97 and 98, the latter in a bracket 99. The shaft 96 is adjustable and may be held in place by set-screws 100. The marker 102 is held between a pair of collars 101 and is held in contact with the ground by a spring 103, secured upon the shaft 96 and having an arm 104 engaging a slot 105 in the seed-marker, which is thus held to its work.

Furrow-openers 106 and covering means of any suitable description may be provided in connection with the seed-planters.

From the foregoing description, taken in connection with the drawings hereto annexed, the operation and advantages of my invention will be readily understood. The frame of the device has been constructed especially with a view to supporting a plurality of such implements as are constantly called into use by the farmer, who is thus by the possession of the single frame enabled to dispense with costly and cumbersome running-gear for each and every implement that may be required. I would have it especially understood that with regard to the construction of the detailed parts of the device I do not limit myself. Neither do I limit myself to the use in connection with my improved frame of any one or more of the devices here shown and described as being capable of use in connection therewith. Neither do I limit myself to the detailed construction of such implements as have herein been shown; but I reserve the right to any and all changes, modifications, and alterations which may be resorted to without departing from the spirit and scope of my invention or detracting from the utility of the same.

Having thus described my invention, I claim—

1. In a machine of the class described, an iron frame comprising vertically-disposed side rails, an arched rear frame, a front frame having an arch formed centrally thereon and an intermediate connecting-frame supported by the side rails and comprising a pair of arches, uprights at the inner ends of the latter, a top piece supported upon said uprights, and braces supporting the ends of said top piece and mounted at their lower ends upon the arches.

2. In a machine of the class described, the combination with the main frame, of a transversely-disposed auxiliary frame having a central arch and arches at its outer ends.

3. In a machine of the class described, the herein-described frame structure comprising side rails, recessed for the reception of wheel-supporting slides, an arched rear rail, a front rail having an arch formed centrally thereon, a transversely-disposed auxiliary frame having a central arch and two outer arches, a longitudinal seat-supporting bar supported upon the central arch of the auxiliary frame and upon the arched rear bar of the main frame, shaft-supporting brackets extending upwardly from the side rails of the frame, and a forward extension of the latter comprising side pieces and a front piece having a tongue-supporting arch.

4. In a machine of the class described, the combination of the main frame, a transversely-disposed auxiliary frame comprising a pair of arches, uprights at the inner ends of the latter, a top piece supported upon said uprights, and braces connecting the latter with the outer arches, brackets rising from the side rails of the main frame in rear of the auxiliary frame, a shaft supported in said brackets, winding-drums revoluble upon said shaft and having ratchet-wheels and hand-wheels attached thereto, spring-actuated pawls engaging said ratchet-wheels, toothed segment-levers mounted pivotally upon the uprights of the auxiliary frame, flexible connecting means between the upper levers and the winding-drums, guide-pulleys for said connecting means, plow-beams connected flexibly with the front rail of the main frame, springs, to force said plow-beams in an outward direction toward the side rails of the frame and flexible connections between the said plow-beams and the lower ends of the lower toothed segment-levers.

5. In a machine of the class described, the combination of the main frame, a transversely-disposed auxiliary frame, a seat-supporting bar connecting the latter with the arched rear rail of the main frame, a footboard supported by brackets depending from said seat-supporting bar, a transversely-disposed shaft, pairs of drums mounted revolubly upon said shaft and having ratchet-wheels and hand-wheels attached thereto, spring-actuated pawls engaging said ratchets, foot-levers mounted upon the footboard, rods connecting said foot-levers with the spring-actuated pawls to disengage the latter from the ratchet-wheels and rope connections between the winding-drums and the members to be adjusted thereby.

In testimony that I claim the foregoing as my own I have hereto affixed my signature in the presence of two witnesses.

JOHN D. McKENZIE.

Witnesses:
ARLE X CARLTON,
 his
 mark
RALPH HORTON.